(12) United States Patent
Yamamoto (10) Patent No.: US 9,948,643 B2
(45) Date of Patent: Apr. 17, 2018

(54) CONNECTION MANAGEMENT OF SMART DEVICES WITH AUTOMOBILE HEAD UNIT

(71) Applicant: Xevo Inc., Kirkland, WA (US)

(72) Inventor: Shin Yamamoto, Tokyo (JP)

(73) Assignee: Xevo Inc., Kirkland, WA (US)

( * ) Notice: Subject to any disclaimer, the term of this patent is extended or adjusted under 35 U.S.C. 154(b) by 135 days.

(21) Appl. No.: 14/988,348

(22) Filed: Jan. 5, 2016

(65) Prior Publication Data
US 2017/0195325 A1 Jul. 6, 2017

(51) Int. Cl.
| H04L 29/06 | (2006.01) |
| H04W 36/00 | (2009.01) |
| H04W 4/04 | (2009.01) |
| H04L 29/08 | (2006.01) |
| H04W 4/00 | (2018.01) |
| H04W 12/06 | (2009.01) |
| H04W 12/08 | (2009.01) |
| H04W 60/00 | (2009.01) |
| H04W 76/02 | (2009.01) |
| H04W 76/06 | (2009.01) |

(52) U.S. Cl.
CPC ........ *H04L 63/0876* (2013.01); *H04L 63/102* (2013.01); *H04L 67/125* (2013.01); *H04W 4/008* (2013.01); *H04W 4/046* (2013.01); *H04W 12/06* (2013.01); *H04W 12/08* (2013.01); *H04W 36/0005* (2013.01); *H04W 60/00* (2013.01); *H04W 76/023* (2013.01); *H04W 76/064* (2013.01)

(58) Field of Classification Search
CPC ... H04M 1/7253; H04W 84/18; H04W 88/00; H04W 4/046; H04W 12/06; H04W 36/0005
See application file for complete search history.

(56) References Cited

U.S. PATENT DOCUMENTS

| 9,031,762 B1 * | 5/2015 | Bell ..................... G06F 17/00 345/173 |
| 9,521,238 B1 * | 12/2016 | Thanayankizil .... H04M 1/7253 |
| 9,703,329 B2 * | 7/2017 | Fischer ................ G06F 1/1632 |

(Continued)

OTHER PUBLICATIONS

International Search Report, dated Feb. 24, 2017, for International Application No. PCT/US2016/066703, 10 pages.

(Continued)

*Primary Examiner* — James R Turchen
(74) *Attorney, Agent, or Firm* — Seed IP Law Group LLP (57) ABSTRACT

Embodiments are directed towards establishing a network connection between a mobile device and an automobile head unit. A user of the mobile device interacts with a user interface on the mobile device to establish the connection with the head unit. If authorized, the head unit disconnects a currently connected device if the connection is to be via classic Bluetooth protocols. If the head unit has reached a maximum number of registered mobile devices, then the head unit sends a request to the mobile device for a selection of which currently registered mobile devices are to be unregistered. The head unit registers the mobile device with the head unit and establishes the connection between the mobile device and the head unit via classic Bluetooth protocols or Bluetooth Low Energy protocols depending on the type of connection request.

20 Claims, 7 Drawing Sheets (56) References Cited

U.S. PATENT DOCUMENTS

| | | | |
|---|---|---|---|
| 2005/0202852 A1* | 9/2005 | Wada | H04M 1/6091 |
| | | | 455/569.1 |
| 2012/0214470 A1 | 8/2012 | Tadayon et al. | |
| 2013/0059600 A1* | 3/2013 | Elsom-Cook | G01S 3/20 |
| | | | 455/456.1 |
| 2014/0155110 A1 | 6/2014 | Park et al. | |
| 2014/0307655 A1 | 10/2014 | Ricci | |
| 2014/0335902 A1* | 11/2014 | Guba | H04W 4/027 |
| | | | 455/456.4 |
| 2015/0295901 A1 | 10/2015 | Woodward et al. | |
| 2016/0323921 A1* | 11/2016 | Thanayankizil | H04W 76/023 |

OTHER PUBLICATIONS

Wikipedia, "Bluetooth," retrieved from http://en.wikipedia.org/wiki/Bluetooth, on Mar. 16, 2017, 25 pages.

* cited by examiner

CONNECTION MANAGEMENT OF SMART DEVICES WITH AUTOMOBILE HEAD UNIT

BACKGROUND

Technical Field

The present disclosure relates to communication networks of automobiles, and more particularly, but not exclusively, to pairing a mobile user device with an automobile head unit without direct user interaction with the head unit.

Description of the Related Art

Automobiles are becoming more and more user friendly and interactive. Many new cars are now manufactured with a user interface, called a head unit, which a user can use to control various aspects of the automobile. For example, the user can use the head unit to change radio stations, change the temperature of the automobile, access maps and global positioning systems, and even access the internet. Advancements in short range mobile communications have expanded the experience of the head unit to the user's mobile phone or tablet. Now, users can access music on their smartphones and have it played through the automobile's sound system. Connecting the user's smart phone to the head unit can often be a cumbersome and confusing process that involves actions on the smartphone as well as on the head unit. It is with respect to these and other considerations that the embodiments described herein have been made.

BRIEF SUMMARY

Briefly stated, embodiments are directed towards establishing a network connection between a mobile device and an automobile head unit. The mobile device provides a user interface for a user to interact with such that the connection is established without the user directly interacting with a user interface on the head unit.

The head unit receives a request to connect the mobile device to the head unit using a short range, wireless connection. If another device is already connected to the head unit using the same wireless connection, and only one device may be connected using that connection at a time, then the head unit sends another request to the mobile device for authorization to disconnect the other mobile device from the head unit. Upon receiving authorization, the head unit disconnects the other mobile device. The head unit then sends its identification information to the mobile device, where the mobile device displays the information to the user. The user selects the head unit using the user interface on the mobile device, which results in the mobile device providing its identification information to the head unit. The head unit then registers the mobile device and establishes the requested connection between the mobile device and the head unit.

These embodiments for establishing a connection between the mobile device and the head unit allow the mobile device to connect to the head unit without the user interacting with the head unit. Typical processes for connecting a mobile device to a head unit require the user to directly interact with the head unit and with the mobile device at different points during the connection process. Embodiments described herein do not require such interactions with the head unit, which allows users in the back seat of the automobile to connect their mobile device to the head unit without having additional assistance from other people in the front seat

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the automobile environment, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
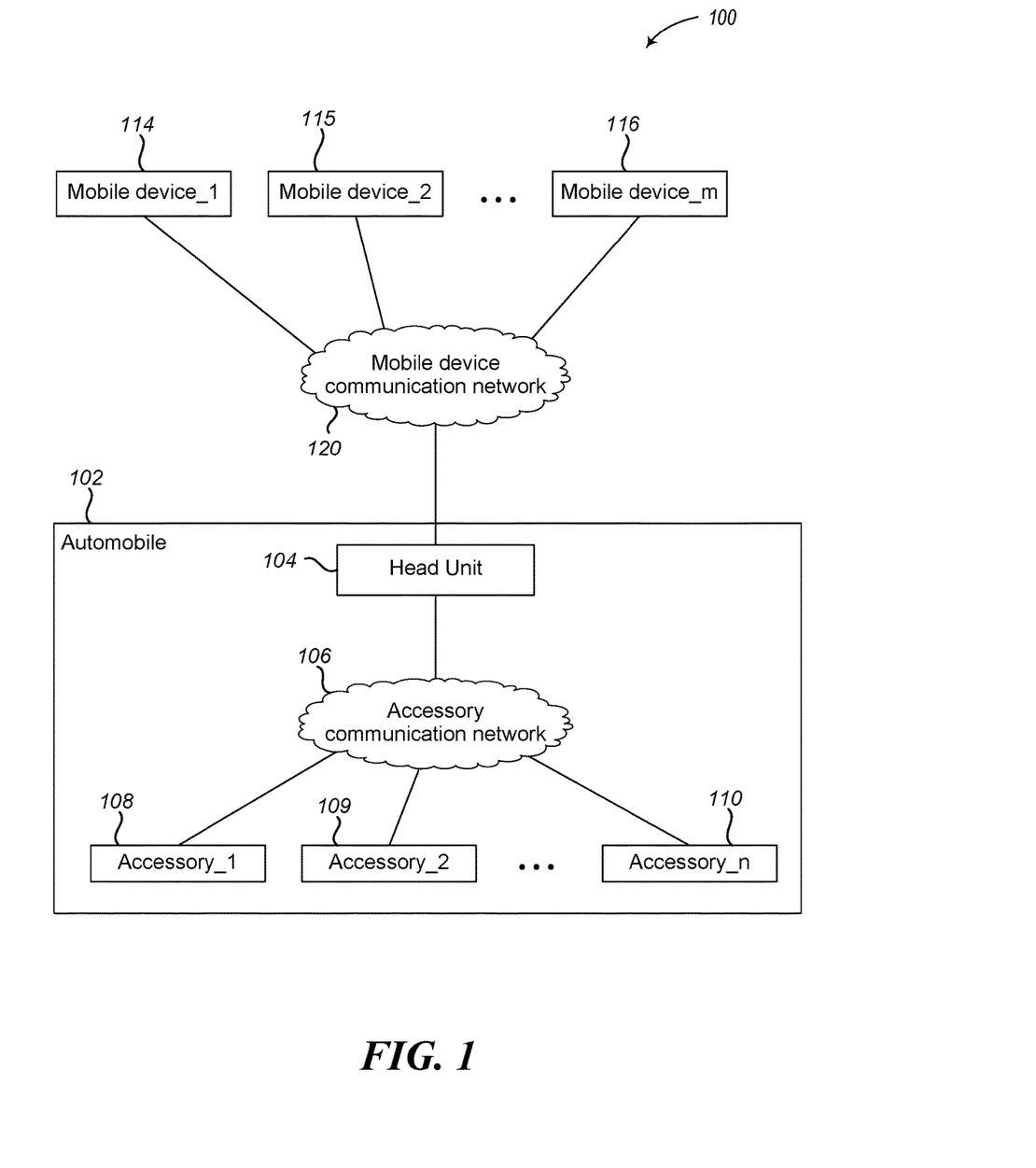
FIG. 1 illustrates a context diagram of an automobile environment for pairing various mobile devices and an automobile head unit in accordance with embodiments described herein.

FIG. 1 illustrates a context diagram of an automobile environment for pairing a user mobile device and an automobile head unit in accordance with embodiments described herein. System 100 includes an automobile 102 and a plurality of mobile devices 114-116.

The mobile devices 114-116 include any device capable of communicating with each other or a head unit 104 of the automobile 102. The mobile devices 114-116 are structured to send and receive content and controls to and from the head unit 104 or other mobile devices of the mobile devices 114-116. Examples of mobile devices 114-116 include, but are not limited to, laptop computers, smart phones, tablet computers, wearable computing devices, or other handheld computing devices.

The automobile 102 is virtually any vehicle that includes a head unit 104. Although this description primarily refers to automobiles, similar embodiments may also be employed in aerial vehicles, water vessels, railroad vehicles, and other modes of transportation that include a head unit and one or more accessories 108-110.

The head unit 104 is a computing device in an automobile that provides interactive controls to a user or occupant of the vehicle. As used herein, the terms user and occupant are interchangeable and refer to any person interacting with the head unit 104, the automobile 102, any of the mobile devices 114-116. The head unit 104 is utilized to control one or more accessories 108-110 or to receive information or data from one or more accessories 108-110. The head unit 104 can display the received information or data or it can provide it to other devices, such as one or more of mobile devices 114-116.

The accessories 108-110 can include any automobile utility or device that is controllable by the user. Examples of these accessories include, but are not limited to, adjustable seats, sun roof, side mirrors, rear-view mirror, air conditioner, power windows, or other controllable features of the automobile 102. Accessories 108-110 also include virtually any automobile utility or device that provides information to the user. Examples of these accessories include, but are not limited to, speedometer, odometer, oil pressure gauge, temperature gauge, or other automobile sensor that provides information to a user of the automobile. Accessories 108-110 further include applications executing on the head unit 104 that have two-way interaction with the user. Examples of these accessories include, but are not limited to, navigation, audio and radio controls, television or music applications, environmental control applications, automobile performance or maintenance applications, or other applications. It should be noted that some accessories may only output data, some accessories may only receive controls to manipulate the accessory, and some accessories may input and output data. For example, a speedometer may only output the current speed of the automobile; a power window may only receive controls to move the window up or down, but not return any information to the head unit; and the navigation system may receive controls for a destination and also return a suggested travel route to the destination. It should be noted that these examples are non-exhaustive and other types of accessories may also be employed.

The head unit 104 communicates with the accessories 108-110 via an accessory communication network 106. The accessory communication network 106 is configured to couple the accessories 108-110 with the head unit 104 to transmit content/data between the accessories 108-110 and the head unit 104. The information communicated between devices may include current accessory status or data, accessory control data, video data, voice data, image data, text data, or other types of data or information. The accessory communication network 106 may include one or more physical networks; one or more wireless communication networks; one or more application program interfaces; or one or more other networks capable of transmitting data from one accessory to another, from an accessory to the head unit 104, or from the head unit to an accessory; or some combination thereof depending on the types of accessories communicating with the head unit 104. For example, the accessory communication network 106 may include an automotive body network, such as a wired controller area network, short range wireless communication network, such as personal area networks utilizing classic Bluetooth or Bluetooth Low energy protocols, or any other type of network.

The head unit 104 communicates with the mobile devices 114-116 via a mobile device communication network 120. The mobile device communication network 120 is configured to couple the mobile devices 114-116 with the head unit 104 to transmit content/data between the mobile devices 114-116 and the head unit 104. The information communicated between devices may include current accessory status or data, requests to access accessory data, requests to control or modify an accessory, video data, voice data, image data, text data, or other types of data or information. The mobile device communication network 120 may include a variety of short range wireless communication networks, such as personal area networks utilizing classic Bluetooth or Bluetooth Low energy protocols, an IR optical network, or network 120, to enable communication between the mobile devices 114-116 and the head unit 104.

In various embodiments, the mobile device communication network 120 and the accessory communication network 106 are separate communication networks. It should be understood that in various embodiments, the mobile devices 114-116 cannot connect to and communicate directly with the accessories 108-110. The head unit 104 acts as a gateway or bridge between the mobile devices 114-116 and the accessories 108-110. In some embodiments, the head unit 104 provides various authentication and verification technologies for permitting or restricting the transfer of accessory data to the mobile devices 114-116 or enabling the mobile devices 114-116 to control an accessory 108-110.

In one alternative, the head unit 104 is not a bridge between the mobile devices 114-116 and the accessories 108-110, but is just a permission unit. There might be one network that connects the mobile devices 114-116 directly to an accessory 108-110 and the head unit 104 will grant permission for communication to occur between the mobile device and the accessory, but is not in the communication itself. The head unit 104 can provide various functions, including, but not limited to, connection handling, data binding, data broadcasting, data marshalling, or other data control techniques or functionality.

The operation of certain aspects of the disclosure will now be described with respect to FIGS. 2A-2B. In at least one of various embodiments, process 200 described in conjunction with FIGS. 2A-2B may be implemented by or executed on one or more computing devices, such as the head unit 104 of the automobile 102.

Figure 2A:
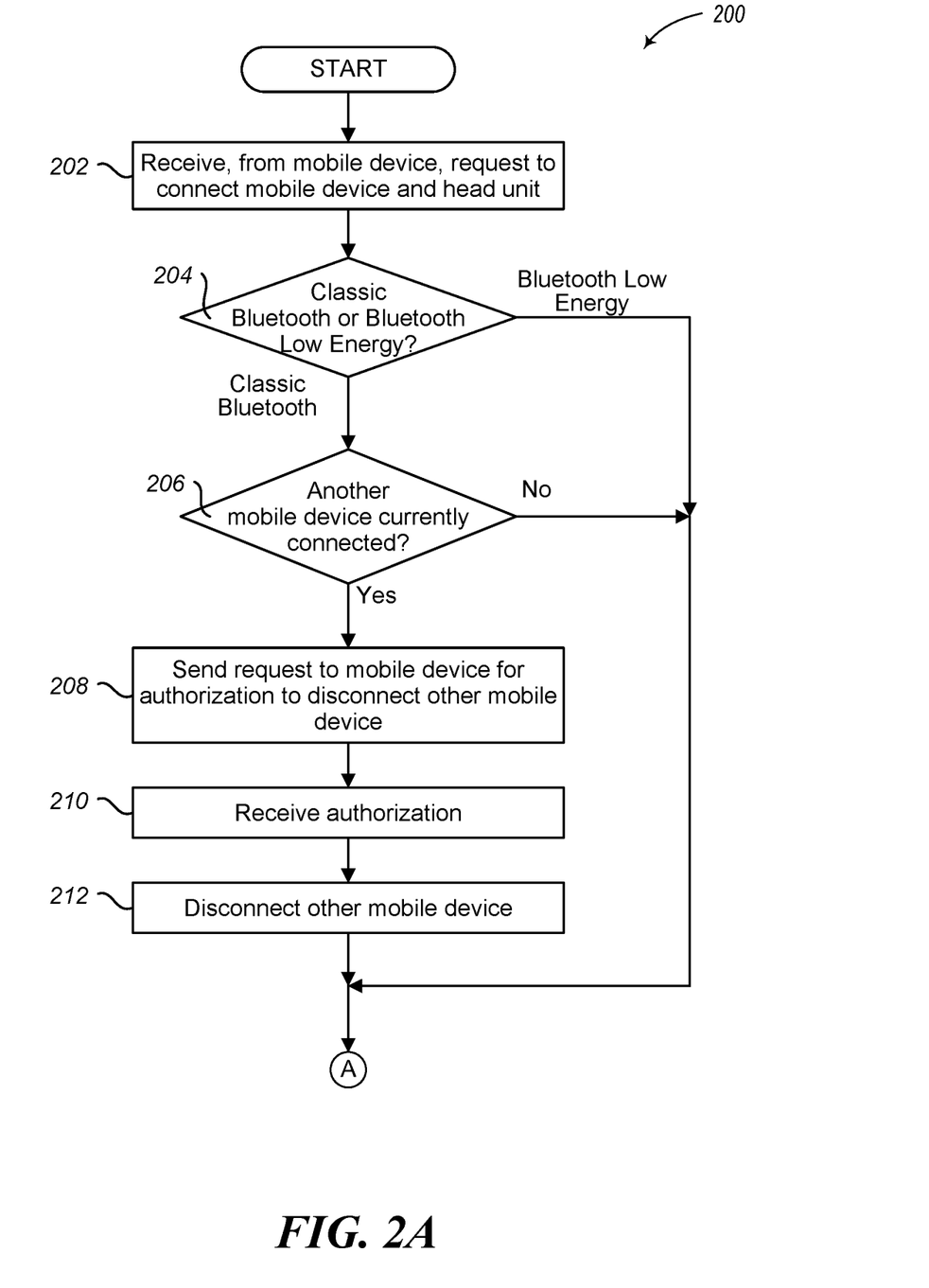
FIGS. 2A-2B illustrates a logical flow diagram generally showing one embodiment of an overview process for pairing a user mobile device and a head unit in accordance with embodiments described herein.
Figure 2B:
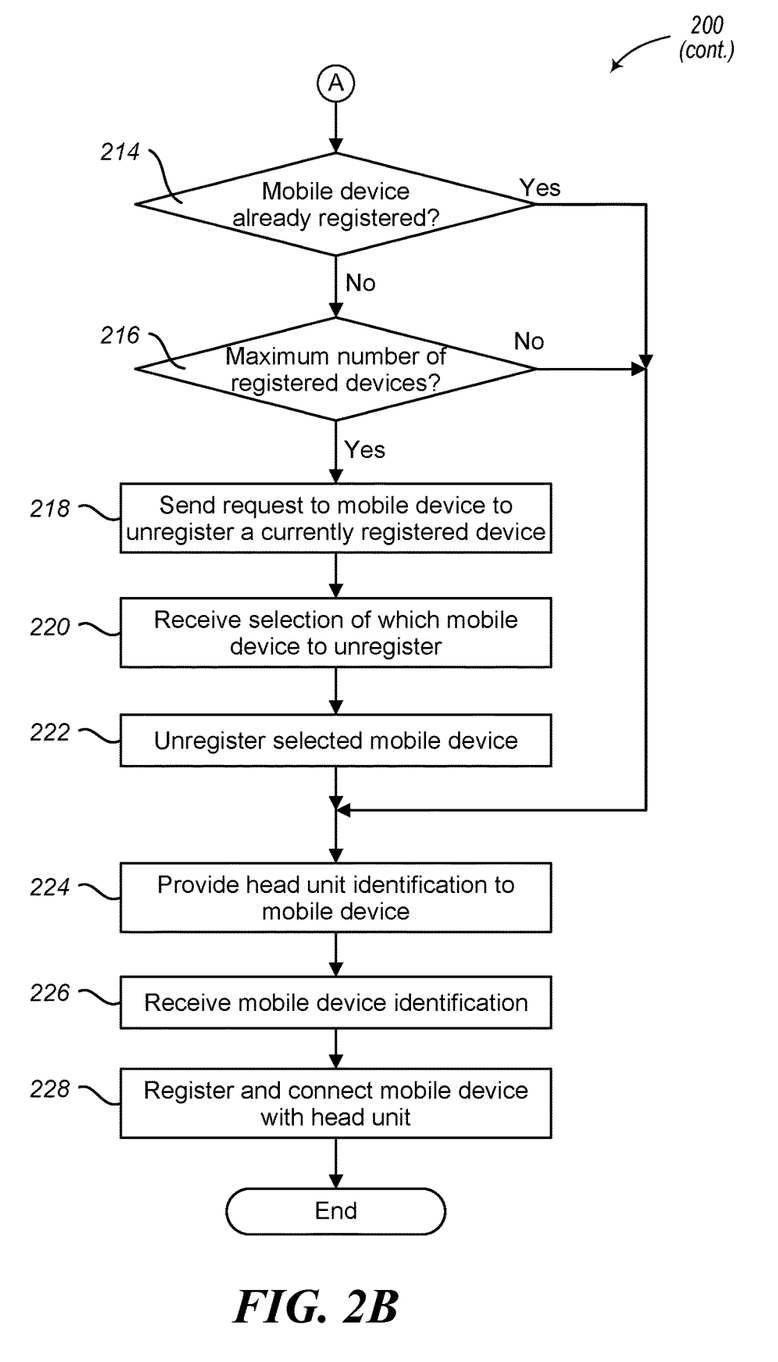

FIGS. 2A-2B illustrate a logical flow diagram generally showing one embodiment of an overview process for pairing a user mobile device and a head unit in accordance with embodiments described herein. Process 200 begins, after a start block, at block 202, where a request is received from a mobile device. The request is to connect the mobile device to the head unit to interact with the head unit itself or to access one or more accessories.

In various embodiments, the request indicates whether the mobile device is to connect to the head unit via classic Bluetooth, or Bluetooth Low Energy, or some other short range wireless protocol. Which Bluetooth protocol to use may be selected by the user of the mobile device or may be selected by an application executing on the mobile phone. In some embodiments, the protocol may be selected based on the type of interactions, messages, or data that will be transmitted between the head unit and the mobile device. For example, if the user intends to use a high bandwidth application, such as watch a video on the mobile device, then NFC or classic Bluetooth may be selected to handle the large amounts of video data to be transmitted from the head unit to the mobile device. In comparison, if the user intends to control the radio, then Bluetooth Low Energy may be selected to handle to the small amounts of radio control data transmitted from the mobile device to the head unit. In at least one embodiment, an amount of bandwidth to transmit data between the mobile device and the head unit may be calculated based on the type of data to be transmitted. If the amount of bandwidth is above a predetermined threshold value, then the preferred short range protocol will be used whether NFC, classic Bluetooth, or other wireless connection is selected to use; otherwise, Bluetooth Low Energy, or a low bandwidth connection, is selected.

Process 200 proceeds to decision block 204, where a determination is made whether the request is to connect via classic Bluetooth or Bluetooth Low Energy. In some embodiments, the request from the mobile phone may indicate which protocol to connect. In other embodiments, the request may identify the type of interactions, messages, or data that will be transmitted between the head unit and the mobile device, and the head unit may select which protocol to use, similar to what is described above in conjunction with block 202. While the example of the flow chart shows the choice as being between classic Bluetooth or Bluetooth Low Energy, this is just one example of the broader group of available connections that include any of the short range wireless connections then available in the industry. If the connection is to utilize Bluetooth Low Energy, then process 200 flows to decision block 214 in FIG. 2B; otherwise, process 200 flows to decision block 206.

At decision block 206, a determination is made whether a first mobile device is currently connected to the head unit via the very same wireless connection protocols. Classic Bluetooth might be used for both. In some embodiments, this determination may be based on a list of current connections maintained by the head unit. In other embodiments, this determination may be based on recent or current transmissions to or from the head unit. If recent or current transmissions utilize classic Bluetooth from another source, then another device is currently connected to the head unit via classic Bluetooth. If a first mobile device is currently connected, then process 200 flows to block 208; otherwise, process 200 flows to decision block 214 in FIG. 2B.

At block 208, a request is sent to a second mobile device, i.e., the mobile device that sent the request received at block 202, for authorization to disconnect the currently-connected other mobile device, in this case, the first mobile device. In some embodiments, the second mobile device displays a message to the user requesting the user to authorize the head unit to disconnect the first mobile device. In some embodiments, if the currently-connected first mobile device is a master device, then the user of the second mobile device requesting to connect via classic Bluetooth may receive a notice that they are prohibited from authorizing the disconnection. In at least one such embodiment, the head unit may send a message to the second mobile device indicating that a connection via classic Bluetooth is not currently available. Or the head unit may send a message to the first mobile device indicating the request, and the first mobile device may provide authorization to disconnect it from the head unit.

For example, assume a mother is in the front passenger seat of the automobile and is watching a video on her tablet, and the tablet is connected to the automobile head unit via classic Bluetooth to accommodate the high bandwidth requirements of the video. The mother's daughter, in the back seat, wants to watch a video on her smartphone. The daughter's smartphone sends a request to use classic Bluetooth to the head unit. The head unit may send a message to the mother's tablet requesting authorization to disconnect the mother's tablet and connect the daughter's smartphone. The mother selects whether or not to provide authorization, and the mother's tablet sends a message to the head unit indicating the mother's selection.

In a separate example, assume the mother's son is in the back seat of the automobile and is watching a video on his smartphone, and the smartphone is connected to the automobile head unit via classic Bluetooth. The daughter from the example above wants to watch a video on her smartphone. The daughter's smartphone sends a request to use classic Bluetooth to the head unit. In this example, the mother's tablet has master permissions and the head unit sends a message to the mother's tablet requesting authorization to disconnect the son's smartphone and connect the daughter's smartphone. The mother selects whether or not to provide authorization, and the mother's tablet sends a message to the head unit indicating the mother's selection.

Process 200 then flows to block 210, where authorization to disconnect the currently-connected other mobile device is received. As described above, this authorization may be received from the mobile device requesting to connect via classic Bluetooth, from the currently-connected other mobile device, or from a master mobile device.

Process 200 proceeds next to block 212, where the classic Bluetooth connection between the first mobile device and the head unit is disconnected. In some embodiments, the head unit may send a message to the first mobile device indicating that it is being disconnected from the head unit. In at least one embodiment, the head unit will then automatically reconnect the other mobile device to the head unit via Bluetooth Low Energy. In another embodiment, the head unit may query the other mobile device regarding reconnection using Bluetooth Low Energy. If the other mobile device is to be reconnected using Bluetooth Low Energy, then process 200 beginning at decision block 216 may be performed for the other mobile device.

In one alternative, the head unit 104 decides which user is provided which type of connection. If the communication networks include multiple types, such as NFC, classic Bluetooth, Bluetooth Low Energy, or yet another type of communication protocol, the head unit 104 can act as an arbiter to determine which mobile device can use which connection protocols. The head unit 104 can collect user priority information, bandwidth needs, distance from the mobile device to the accessory, and power levels of the mobile device battery, and using these various data, determine which mobile device is permitted to use which type of communication network and then link them to each other with the determined network. For example, a first mobile device with high bandwidth needs has a higher priority for a higher bandwidth communication protocol, e.g., classic Bluetooth, than a second mobile device with lower bandwidth needs, which can utilize a lower bandwidth communication protocol, e.g., Bluetooth Low Energy. In this case, the first mobile device is automatically assigned the higher bandwidth communication protocol and the second mobile device is automatically assigned the lower communication bandwidth protocol. Each mobile device may also have a connection priority based on its permissions. For example, a master mobile device may always have priority to a higher bandwidth or more stable connection than a non-master mobile device. In this way, the mother using her tablet to watch a movie would have a higher priority than the daughter watching a movie on her smart phone.

If at decision block 204 the mobile device is requesting to use Bluetooth Low Energy, or if at decision block 206 no other mobile device is currently connected, or after the other mobile device is disconnected at block 212, process 200 continues on FIG. 2B at decision block 214. At decision block 214, a determination is made whether the mobile device is already registered with the head unit. This determination may be performed by querying a list or other data structure maintained by the head unit for previously registered mobile devices. In some embodiments, the head unit may store unique identifiers of each previously registered mobile device. The unique identifiers may be a phone number, Internet Protocol (IP) address, Mobile Identification Number, Media Access Control (MAC) address, electronic serial number, or other device identifier. If the mobile device is already registered, then process 200 flows to block 224; otherwise, process 200 flows to decision block 216.

At decision block 216, a determination is made whether a maximum number of registered devices has been met by the head unit. In some embodiments, the head unit may have a maximum number of registration slots available. For example, the head unit may only be able to register a maximum of seven different mobile devices. But, in other embodiments, the head unit is not limited to a maximum number of registered devices, and may dynamically change the number of registered devices so that it continually registers additional mobile devices. If the maximum number of mobile devices has been reached, then process 200 flows to block 218; otherwise, process 200 flows to block 224.

At block 218, the head unit sends a request to the mobile device to unregister one or more of the currently registered devices. In some embodiments, the request includes an identifier of other currently registered mobile devices. The user of the mobile device can use a user interface to select which of the currently registered devices to unregister from the head unit.

In some embodiments, the ability for the mobile device to unregister another device may depend on the permissions of the mobile device or the status of the currently registered devices. For example, in some embodiments, some currently registered mobile devices may not be included in the request or may be locked and not selectable by the user. These locked mobile devices may be administrator or master devices, or other devices that are predetermined to be unregisterable except by a master device. In other embodiments, the request to unregister mobile devices is sent to a master mobile device, which may or may not be the mobile device attempting to connect to the head unit. These additional protections prevent a user of the mobile device from willingly unregistering specific other mobile devices.

Process 200 proceeds to block 220, where the selection of which registered mobile devices to unregister is received. As indicated above, this indication may be received from the mobile device, from a master mobile device, or from some other mobile device that has permission to unregister mobile devices.

Process 200 continues at block 222, where the head unit unregisters the selected mobile devices. In at least one embodiment, the list of registered mobile devices is modified to remove the identifiers of the selected mobile devices from the list.

Process 200 proceeds next to block 224, where an identification of the head unit is provided to the mobile device requesting to connect to the head unit. In some embodiments, the head unit identification is a unique head unit identifier, IP address, MAC address, electronic serial number, or other device identifier. In at least one embodiment, the head unit identification includes a name of the head unit, accessories accessible to the mobile device via the head unit, or other information associated with the head unit. For example, the information may identify the permissions that the mobile device will have when accessing or controlling the head unit or the accessories. It will also include the type of network connections each mobile device is capable of using whether NFC, Bluetooth, IR or others.

In one embodiment, the head unit has information on the exact location of the mobile device. Using triangulation or other location technology working with the network 120 or other technique, the head unit determines that the mobile device is at the driver seat. It can also determine that it is in the back seat, in the back seat in the console between the seats, or between the front and back seats, or other location in larger or small vehicles. After the head unit knows the location, it can determine which types of permission to grant to the mobile device. It can grant video viewing permission to a passenger in a front or back seat, but not to a mobile user located in a driver viewing location. It can permit control of mirrors or seats to any mobile device or it can limit control of mirrors to only the driver located mobile device and control of a seat only to a mobile device that is within the boundaries of that particular seat. These are just a few examples of location-based permissions that the head unit 104 can provide to the various mobile devices 114-116 and other location-based permissions can be provided. Namely, the permissions granted to a particular mobile device 114-116 to control accessory 108-110 can be based on the location of that particular mobile device 114 or location of that particular accessory 108, in addition to or instead of a priority routing bandwidth need or other factors.

The mobile device displays at least some information regarding the head unit, such as the name of the head unit, to the user via a user interface executing on the mobile device. The user interface includes a button or other interactive object that enables the user to select the head unit to finalize the connection of the mobile device with the head unit.

Process 200 continues at block 226, where an identification of the mobile device is received at the head unit. The mobile device sends its identification to the head unit in response to the user selecting the head unit displayed to the user on the mobile device. As described above, this identification may be a phone number, IP address, Mobile Identification Number, MAC address, electronic serial number, or other device identifier.

Process 200 proceeds next to block 228 to register and connect the mobile device with the head unit. In at least one embodiment, the head unit adds the identification of the mobile device to the list or other data structure of registered mobile devices. In some embodiments, the mobile device and head unit may pass one or more encryption keys back and forth to establish an encrypted connection between the mobile device and the head unit. Moreover, whether the mobile device and the head unit are connected via any connection, whether classic Bluetooth, Bluetooth Low Energy, or other network is dependent on the determination at decision block 204, and whether the request is to communicate via classic Bluetooth, Bluetooth Low Energy, or other network.

After block 228, process 200 terminates or otherwise returns to a calling process to perform other actions.

Figure 3A:
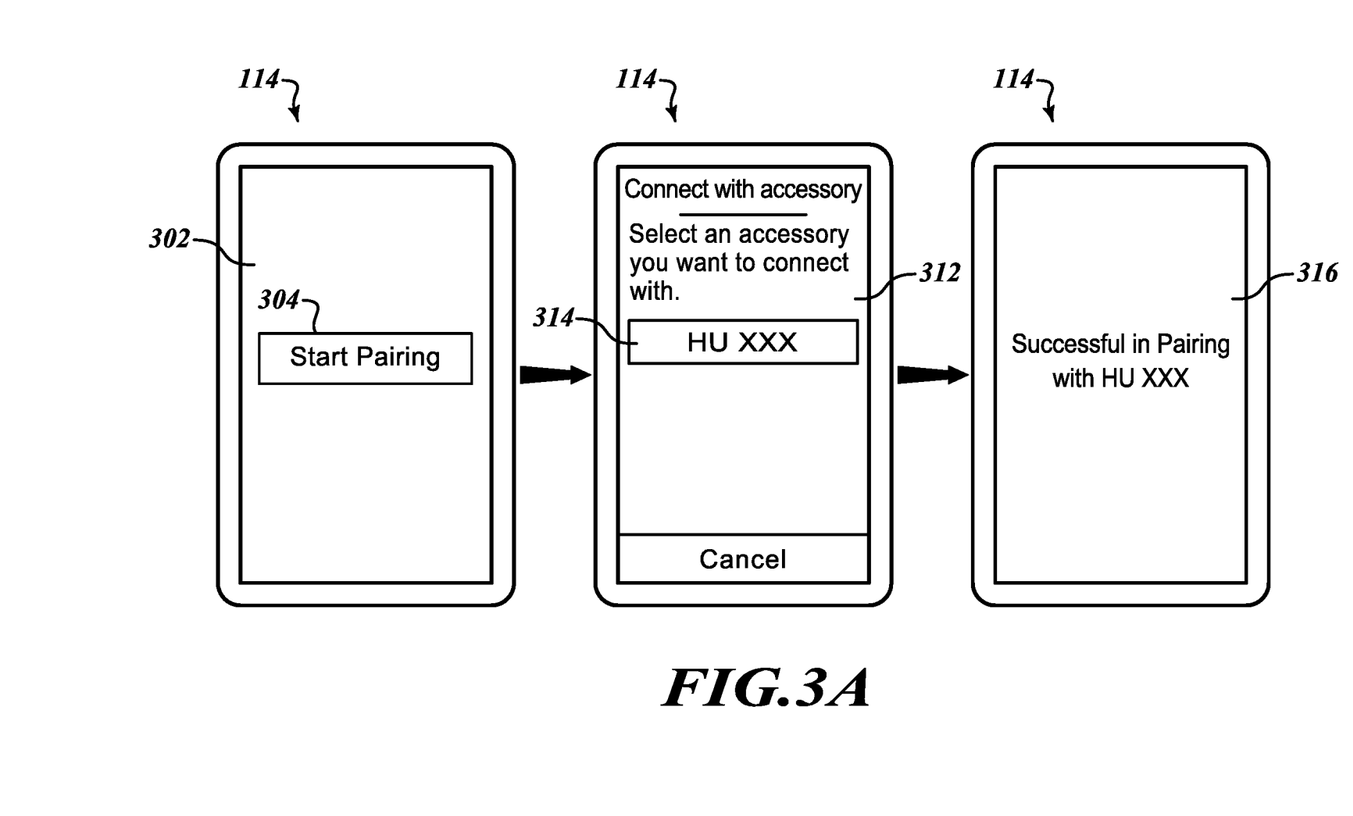
FIGS. 3A-3C show various use case examples of screenshots from a user mobile device as the user mobile device is paired with a head unit in accordance with embodiments described herein.
Figure 3B:
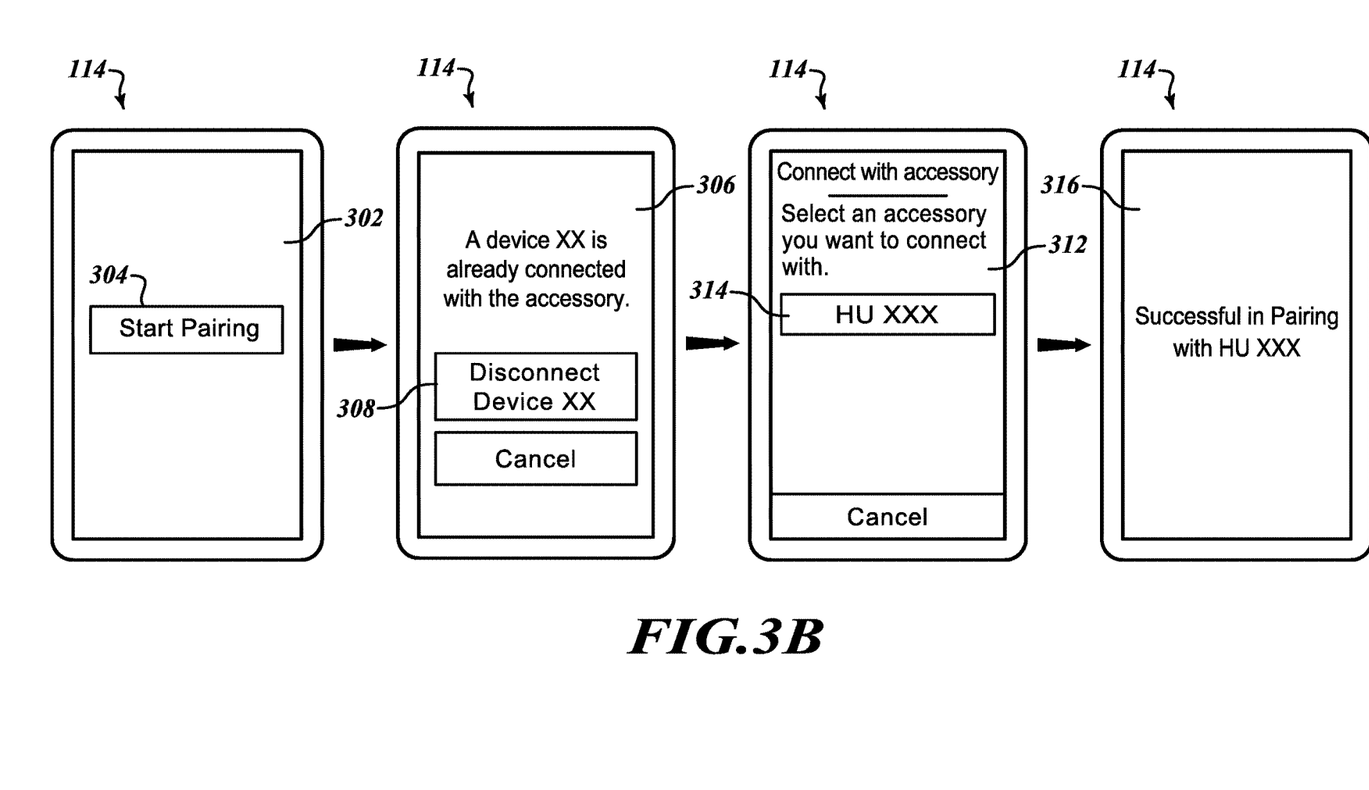
Figure 3C:
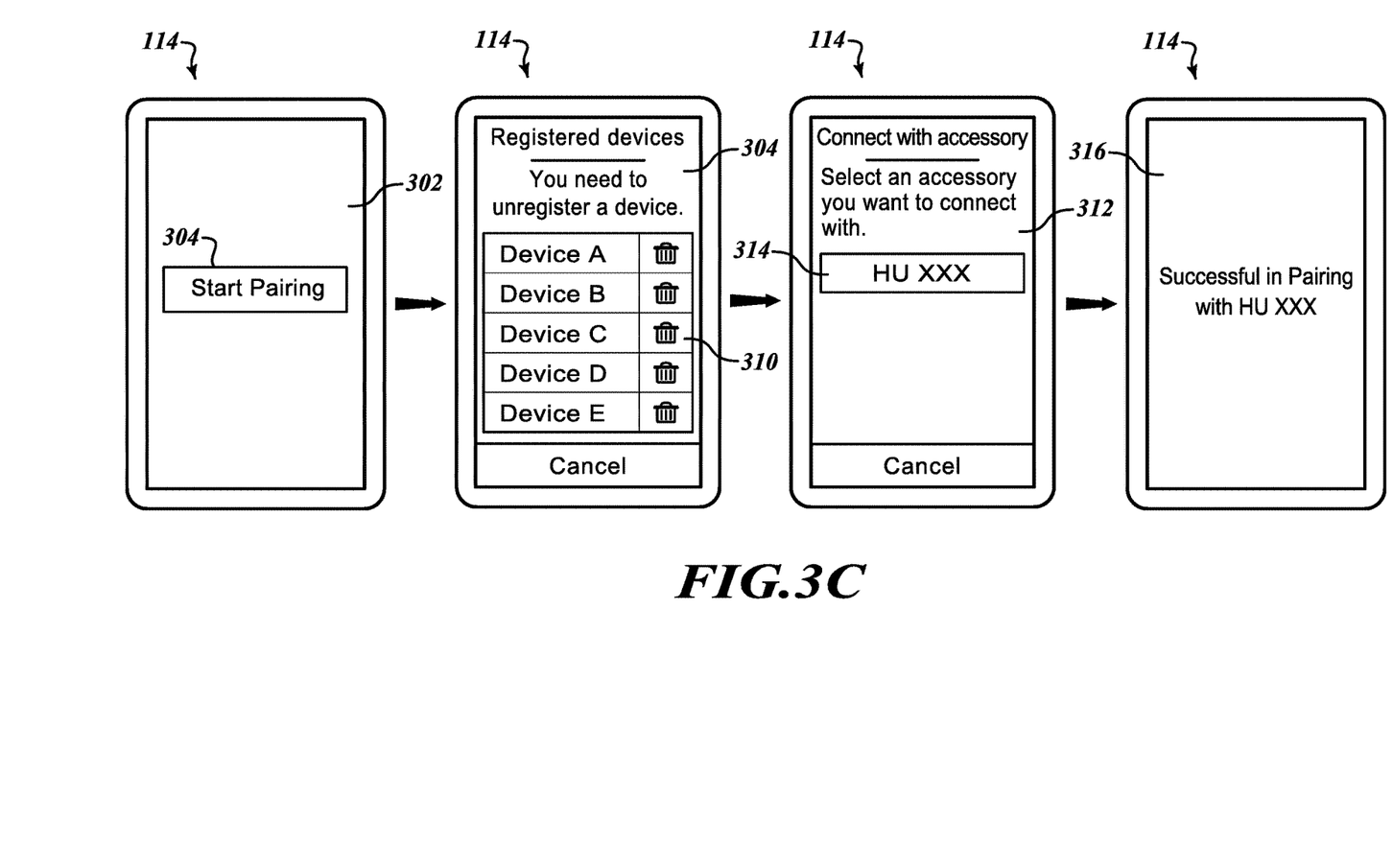

FIGS. 3A-3C show various use case examples of screenshots from a user mobile device as the user mobile device is paired with a head unit in accordance with embodiments described herein. As described herein, an application executing on a mobile device of the user may provide a user interface to the user with various different screens, which are illustrated in FIGS. 3A-3C.

Starting with FIG. 3A, the mobile device displays screen 302, which includes a button 304 to initiate the pairing of the mobile device 114 with the head unit. In response to the user clicking button 304, the mobile device sends to the head unit a request to connect to the head unit. As described herein, the application may determine whether the requested connection will be via classic Bluetooth or Bluetooth Low Energy. In other embodiments, this screen may include other buttons or options, not illustrated, where the user can select which protocol to utilize.

Assuming the request is to connect via Bluetooth Low Energy, or classic Bluetooth with no other mobile device currently connected via classic Bluetooth, and the head unit has not reached a maximum number of registered mobile devices, the head unit provides its identifying information to the mobile device. The mobile device displays screen 312, which includes a variety of information and the identifying information of the head unit as button 314. In the example shown, screen 312 states "Connect with accessory" because in some embodiments, the mobile device may be able to connect directly with other accessories without going through the head unit. In those embodiments, the accessory can perform embodiments similar to that of the head unit as described herein.

In response to the user clicking button 314, the mobile device sends its identifying information to the head unit. The head unit registers the mobile device and finalizes establishing the connection between the mobile device and the head unit. Once connected, the head unit sends a completion indication to the mobile device. The mobile device displays screen 316 indicating that the mobile device is now connected to the head unit.

FIG. 3B is similar to FIG. 3A, but where the request is to connect via classic Bluetooth and there is another device currently connected to the head unit via classic Bluetooth. The mobile device displays screen 302, which includes a button 304 to initiate the pairing of the mobile device with the head unit. In response to the user clicking button 304, the mobile device sends to the head unit a request to connect to the head unit. The head unit identifies that there is another mobile device currently connected via classic Bluetooth. The head unit provides a request to the mobile device for authorization to disconnect the other mobile device.

The mobile device displays screen 306, which identifies the currently connected device and includes button 308 to disconnect the currently connected device. In response to the user clicking button 308, the mobile device sends to the head unit authorization to disconnect the currently connected mobile device. Assuming that the head unit has not reached a maximum number of registered mobile devices, the head unit provides its identifying information to the mobile device. The mobile device displays screen 312, which includes the identifying information of the head unit as button 314. In response to the user clicking button 314, the mobile device sends its identifying information to the head unit. The head unit registers the mobile device and finalizes establishing the connection between the mobile device and the head unit. Once connected, the head unit sends a completion indication to the mobile device. The mobile device displays screen 316 indicating that the mobile device is now connected to the head unit.

FIG. 3C is similar to FIG. 3A, but where the head unit has reached its maximum number of registered mobile devices. The mobile device displays screen 302, which includes a button 304 to initiate the pairing of the mobile device with the head unit. In response to the user clicking button 304, the mobile device sends to the head unit a request to connect to the head unit.

Assuming the request is to connect via Bluetooth Low Energy, or classic Bluetooth with no other mobile device currently connected via classic Bluetooth, the head unit identifies that it has reached its maximum number of registered users. The head unit provides a request to the mobile device for a selection of one or more registered mobile devices to unregister.

The mobile device displays screen 309, which identifies a list of the currently registered devices. The user can select one of the registered devices, such as device 310, by clicking on the device name or the "trash can" button. In response to this selection, the mobile device sends the information of the selected registered device back to the head unit. The head unit then unregisters the selected device and provides its identifying information to the mobile device. The mobile device displays screen 312, which includes the identifying information of the head unit as button 314. In response to the user clicking button 314, the mobile device sends its identifying information to the head unit. The head unit registers the mobile device and finalizes establishing the connection between the mobile device and the head unit. Once connected, the head unit sends a completion indication to the mobile device. The mobile device displays screen 316 indicating that the mobile device is not connected to the head unit.

These example screenshots are not to be limiting or exhaustive and other screenshots may be utilized, which may include additional information or functionality of the type of choices described herein.

Figure 4:
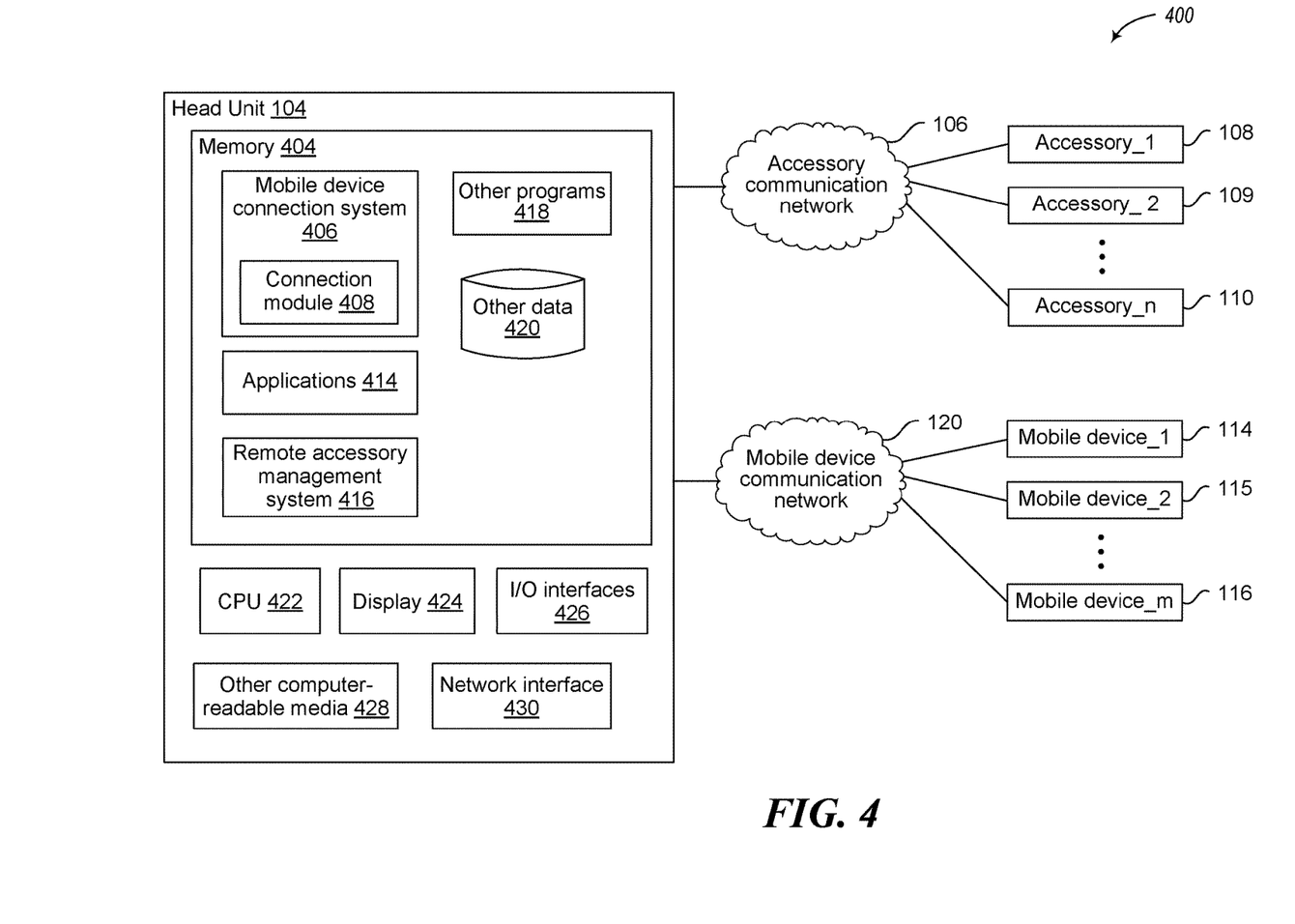
FIG. 4 shows a system diagram that describes one implementation of computing systems for implementing embodiments described herein.

FIG. 4 shows a system diagram that describes one implementation of computing systems for implementing embodiments described herein. System 400 includes head unit 104, accessories 108-110, and mobile devices 114-116. Head unit 104 communicates with accessories 108-110 via accessory communication network 106, and communicates with mobile devices 114-116 via mobile device communication network 120, as described herein.

One or more special-purpose computing systems is used to implement head unit 104 to provide easy pairing and connection between the head unit 104 and the mobile devices 114-116. Accordingly, various embodiments described herein may be implemented in software, hardware, firmware, or in some combination thereof.

Head unit 104 includes memory 404, one or more central processing units (CPUs) 422, display 424, I/O interfaces 426, other computer-readable media 428, and network interface 430.

Memory 404 may include one or more various types of non-volatile and/or volatile storage technologies. Examples of memory 404 include, but are not limited to, flash memory, hard disk drives, optical drives, solid-state drives, various types of random access memory (RAM), various types of read-only memory (ROM), other computer-readable storage media (also referred to as processor-readable storage media), or other memory technologies, or any combination thereof. Memory 404 may be utilized to store information, including computer-readable instructions that are utilized by CPU 422 to perform actions, including embodiments described herein.

Memory 404 may have stored thereon mobile device connection system 406, which includes connection module 408. Connection module 408 may employ embodiments described herein to establish a network connection with one or more of mobile devices 114-116. Memory 404 may also store other programs 418 and other data 420. Other data 420 may store a list or other data structure of the mobile devices that are currently registered with the head unit 104 or currently connected to the head unit 104. The other data 420 may also store other data associated with the various accessories 108-110. For example, the other data 420 may store music playlists or radio station favorites, map waypoints, user contact information, user preferences for heads-up-display information and layout, etc.

Applications 414 include various software related programs that are accessible to a user on the head unit 104. Applications 414 may include one or more accessories. These accessories may include, for example, navigation applications, radio and audio applications, automobile environmental controls applications, automobile performance or maintenance applications, or other automobile related applications.

Remote accessory management system 416 interacts with one or more of accessories 108-110 via accessory communication network 106. The remote accessory management system 416 may interact with a controller area network, Bluetooth network, or other automotive communication system to send information or requests to the accessories 108-110 or to receive information from the accessories 108-110.

Display 424 is a display device capable of rendering content or information to a user. For example, display 424 may display maps, radio station information, applications, environmental controls for the automobile, other user interfaces, etc. The display 424 may be a liquid crystal display, light emitting diode, or other type of display device, and include a touch sensitive screen capable of receiving inputs from a user's hand, stylus, or other object.

I/O interfaces 426 may include interfaces for various other input or output devices, such as audio interfaces, other video interfaces, USB interfaces, or the like.

Other computer-readable media 428 may include other types of stationary or removable computer-readable media, such as removable flash drives, external hard drives, or the like.

Network interface 430 is configured to communicate with other computing devices, such as mobile devices 114-116 via mobile communication network 120 or accessories 108-110 via accessory communication network 106.

The various embodiments described above can be combined to provide further embodiments. All of the U.S. patents, U.S. patent application publications, U.S. patent applications, foreign patents, foreign patent applications and non-patent publications referred to in this specification or listed in the Application Data Sheet are incorporated herein by reference, in their entirety. Aspects of the embodiments can be modified, if necessary, to employ concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method to establish a network connection between a head unit of an automobile and a plurality of mobile devices, comprising:
   connecting a first mobile device to the head unit with a short range wireless protocol;
   receiving, at the head unit, from a second mobile device, a connection request to establish a short range wireless connection between the second mobile device and the head unit;
   sending a request to the second mobile device for authorization to disconnect the first mobile device from the head unit in response to a determination that the requested connection is to utilize the same short range wireless protocol that the first mobile device is currently using for its connection to the head unit;
   disconnecting the first mobile device from the head unit in response to receiving authorization from the second mobile device to disconnect the first mobile device from the head unit;
   providing identification of the head unit to the second mobile device for display on the second mobile device and selection by a user of the second mobile device;
   receiving identification at the head unit of the second mobile device from the second mobile device in response to the user selecting the head unit;
   registering the second mobile device with the head unit; and
   establishing the connection between the second mobile device and the head unit.

2. The method of claim 1, further comprising:
   unregistering at least one registered mobile device from the head unit in response to a determination that the mobile device is unregistered with the head unit and that a maximum number of other mobile devices are already registered with the head unit.

3. The method of claim 1, further comprising:
   determining bandwidth requirements between the second mobile device and the head unit based on a type of data to be transmitted from the head unit to the second mobile device; and
   selecting utilization of classic Bluetooth protocols for the requested connection if the bandwidth requirements are above a predetermined threshold.

4. The method of claim 1, further comprising:
   determining bandwidth requirements between the second mobile device and the head unit based on a type of data to be transmitted from the head unit to the second mobile device; and selecting utilization of Bluetooth Low Energy for the requested connection if the bandwidth requirements are below a predetermined threshold.

5. The method of claim 1, wherein the sending of the request to the second mobile device for authorization to disconnect the first mobile device from the head unit includes:
sending of the request to a master mobile device for authorization to disconnect the first mobile device from the head unit, the master mobile device being enabled to provide authorization to the head unit to disconnect the first mobile device.

6. The method of claim 2, further comprising:
sending another request to the second mobile device for selection of the at least one registered mobile device to unregister from the head unit; and
receiving the selection of the at least one registered mobile device from the second mobile device.

7. The method of claim 2, wherein the mobile device is prohibited from unregistering registered mobile devices that have a locked registration.

8. The method of claim 1, wherein the establishing the connection between the second mobile device and the head unit includes:
connecting the second mobile device and the head unit to communicate via classic Bluetooth protocols in response to a determination that the requested connection is to utilize classic Bluetooth protocols.

9. The method of claim 1, wherein the establishing the connection between the second mobile device and the head unit includes:
connecting the second mobile device and the head unit to communicate via Bluetooth Low Energy protocols in response to a determination that the requested connection is to utilize Bluetooth Low Energy protocols.

10. A head unit for an automobile, comprising:
a memory that stores instructions; and
a processor that executes the instructions to:
receive, at the head unit and from a mobile device, a communication request to establish a network connection between the mobile device and the head unit using a short range wireless networking protocol;
send, to the mobile device, a request for authorization to disconnect another mobile device from the head unit in response to a determination that the other mobile device is currently connected to the head unit and is currently using the same short range wireless networking protocol;
disconnect the other mobile device from the head unit in response to receiving authorization from the mobile device to disconnect the other mobile device from the head unit;
provide identification of the head unit to the mobile device for display on the mobile device and selection by a user of the mobile device;
receive identification of the mobile device from the mobile device in response to the user selecting the head unit; and
register the mobile device with the head unit and establish the network connection between the mobile device and the head unit using the short range wireless networking protocol.

11. The head unit of claim 10, the processor further executes the instructions to:
unregister at least one registered mobile device from the head unit in response to a determination that a maximum number of other mobile devices are already registered with the head unit.

12. The head unit of claim 10, the processor further executes the instructions to:
determine that a maximum number of other mobile devices are already registered with the head unit and the mobile device is unregistered with the head unit;
send another request to a master mobile device for selection of at least one registered mobile device to unregister from the head unit; and
receive the selection of the at least one registered mobile device from the master mobile device; and
unregister the at least one registered mobile device from the head unit.

13. The head unit of claim 10, the processor further executes the instructions to:
determine the networking protocol based on an amount of bandwidth to transmit data between the mobile device and the head unit.

14. The head unit of claim 10, the processor further executes the instructions to:
send the request for authorization to a third mobile device identified as a master device; and
receive authorization to disconnect the other mobile device from the third mobile device.

15. The head unit of claim 10, the processor further executes the instructions to:
establish the network connection between the mobile device and the head unit to communicate via classic Bluetooth protocols.

16. The head unit of claim 10, the processor further executes the instructions to:
establish the network connection between the mobile device and the head unit to communicate via Bluetooth Low Energy protocols.

17. A system, comprising:
a plurality of accessories of an automobile;
a head unit that includes:
a memory that stores instructions; and
a processor that executes the instructions to:
receive, at the head unit and from a first mobile device, a request to establish a wireless connection between the first mobile device and the head unit using Bluetooth protocols;
send, to the first mobile device, a request for authorization to disconnect a connection between a second mobile device and the head unit in response to a determination that the requested wireless connection is to utilize the same Bluetooth protocols and that the second mobile device is currently connected to the head unit;
disconnect the second mobile device in response to receiving authorization from the first mobile device to disconnect the second mobile device;
provide identification of the head unit to the first mobile device for display on the first mobile device and selection by a user of the first mobile device;
receive identification of the first mobile device in response to the user selecting the head unit;
register the first mobile device with the head unit; and
establish the requested wireless connection between the first mobile device and the head unit using Bluetooth protocols to provide the first mobile device with access to the plurality of accessories.

18. The system of claim 17, the processor further executes the instructions to:
   send an authorization request to the first mobile device for authorization to disconnect the connection between the second mobile device and the head unit; and
   receive the authorization from the first mobile device.

19. The system of claim 17, the processor further executes the instructions to:
   connect the first mobile device and the head unit via classic Bluetooth protocols in response to the request indicating use of classic Bluetooth protocols.

20. The system of claim 17, the processor further executes the instructions to:
   connect the first mobile device and the head unit via Bluetooth Low Energy protocols in response to the request indicating use of Bluetooth Low Energy protocols.

* * * * *